No. 794,480. PATENTED JULY 11, 1905.
S. T. BAILEY.
VETERINARY APPARATUS.
APPLICATION FILED MAR. 14, 1905.

2 SHEETS—SHEET 1.

Witnesses
Edgeworth Greene
H. Merrill.

Samuel T. Bailey
Inventor:
By his Attorney H. A. West

No. 794,480. PATENTED JULY 11, 1905.
S. T. BAILEY.
VETERINARY APPARATUS.
APPLICATION FILED MAR. 14, 1905.
2 SHEETS—SHEET 2.
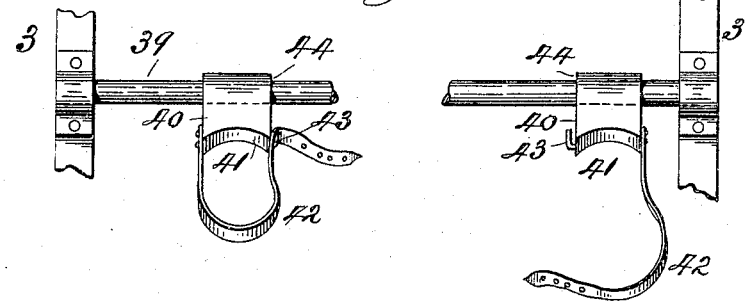
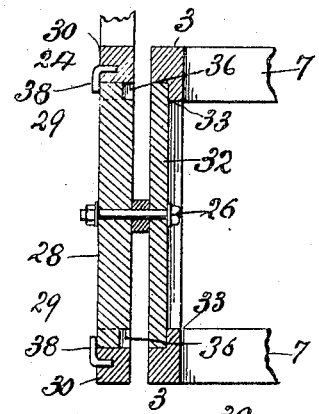
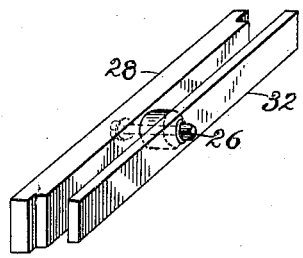
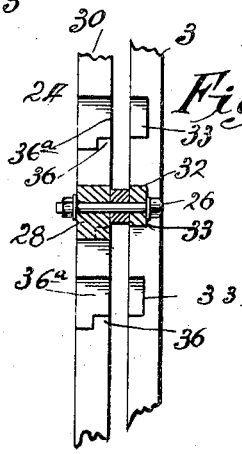
Samuel T. Bailey, Inventor
By his Attorney H. A. West
Witnesses No. 794,480.

Patented July 11, 1905.

UNITED STATES PATENT OFFICE.

SAMUEL T. BAILEY, OF MOUNT HOPE, WEST VIRGINIA.

VETERINARY APPARATUS.

SPECIFICATION forming part of Letters Patent No. 794,480, dated July 11, 1905.

Application filed March 14, 1905. Serial No. 250,037.

*To all whom it may concern:*

Be it known that I, SAMUEL T. BAILEY, a citizen of the United States, and a resident of Mount Hope, in the county of Fayette and State of West Virginia, have invented certain new and useful Improvements in Veterinary Apparatus, of which the following is a specification.

My invention relates to an apparatus for the handling of animals designed for veterinary smithery and like services; and my invention consists, mainly, in a stall which may be tipped from vertical to horizontal position to form a table on which the animal is confined for shoeing or other treatment.

The invention also consists in the construction, arrangement, and combination of parts, all as hereinafter described and claimed.

Figure 1:
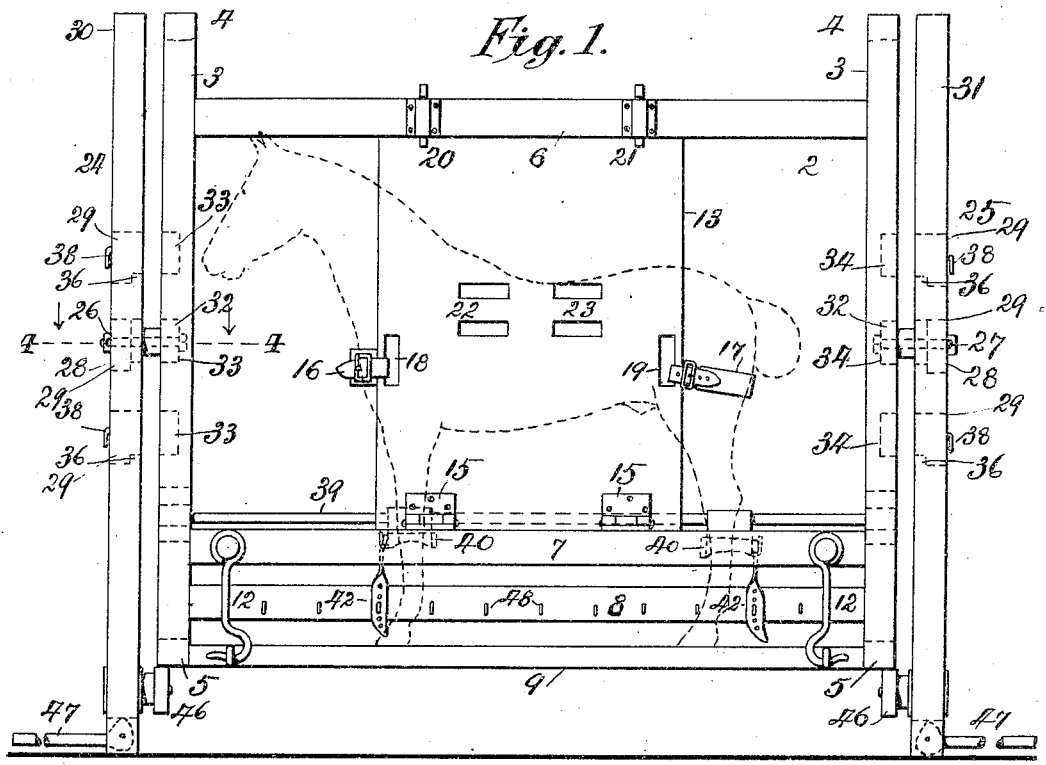
Figure 2:
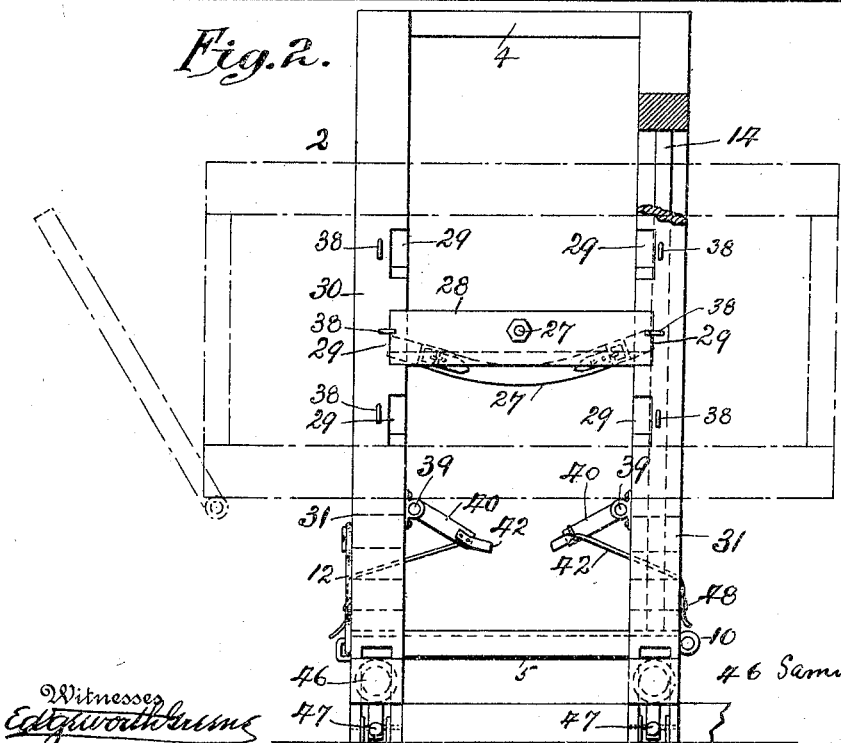

In the accompanying drawings, to which reference is made and which form a part of this specification, Figure 1 is a side elevation of my new veterinary apparatus in upright position. Fig. 2 is an end elevation of the same, showing the stall in horizontal position in dotted lines. Fig. 3 is a detailed view of the device for holding the legs of the animal. Fig. 4 is a sectional elevation on line 4 4 of Fig. 1. Fig. 5 is a perspective view of the trunnion device removed, and Fig. 6 is a detailed sectional elevation taken at the center of Fig. 4.

In the drawings, 2 designates a stall constructed of corner-uprights 3, suitably framed together by end cross-pieces 4 5 and side cross-pieces 6, 7, and 8. The bottom or floor 9 is hinged at 10, so that it may be lowered when the stall is in horizontal position, as shown in dotted lines in Fig. 2, allowing access to the animal's feet. When the stall is in vertical position, the floor is fastened by hooks 12 or by other suitable fastening device to form a suitable floor for the animal to stand upon.

13 14 designate side walls for the stall, the latter forming a table for the animal to lie upon when the stall is in horizontal position. The wall 13 is hinged at 15, (see Fig. 1,) so that it can be opened outward or pressed in against the side of the animal in the stall or upon the table 14, and straps 16 17 are provided for confining the animal, and which are, by preference, attached to the said walls in corresponding openings 18 19, as clearly indicated in Fig. 1. The wall 13 may be held in closed position by the bolts 20 21. I do not limit myself to any special number of straps, as straps may be connected in the openings 22 23 to go over the back or under the belly of the animal.

The stall is supported by and between strong uprights 24 at the front and 25 at the rear. These uprights support the stall by trunnions 26 and 27, on which the stall may be turned from vertical to horizontal position with the animal held therein. The trunnions are vertically adjustable as to the stall and to the main supporting-uprights, so that they may be located to approximate the center of gravity of the animal to be treated, thus enabling the stall to be turned easily from one position to the other. In this instance the trunnions are held in cleats 28, which may be placed in either of the mortises 29 29 of the posts 30 30 31 31 of the front and rear supporting-uprights for the stall. The trunnions each have a cleat 32 connected to them which enters either of the mortises 33 33 34 34 in the corner-posts of the stall, and by this means the stall is connected to the trunnions. I do not, however, limit myself to this means for pivoting the stall, as other means may be employed, all within the scope of my invention.

The cleats 28 are, by preference, wider than the cleats 32, and the mortises 29 are made of a size to correspond, and passages 36ª are formed through the posts to allow the cleats 32 to pass through, thus forming shoulders 36 36 for the cleats 28 to abut against. When the cleats are in place, they are fastened by hooks 38 38 or by other suitable fastening devices.

39 39 designate rods to which the animal's legs are bound. On each rod is placed a pair of blocks 40, (see Fig. 3,) which slide along the rod, so that they may be located to correspond with the size of the animal and as to whether the legs are to be held forward or back. The outer edge of each block, is by preference, curved, as shown at 41, and it is provided with a strap 42, adapted to be passed around the leg of the animal and secured by a hook 43 or by any other fastening device. Each block is formed with an eye or passage 44 and is of considerable width, so that no pressure at the outer edge of the block where the legs are fastened will slide the block upon the rod; but such pressure will bind the block on the rod. In this way while the blocks may be easily and quickly moved by hand no struggling of the animal will shift the blocks.

When the stall is in upright position ready to have the animal led or backed in, it will be supported upon the rollers or other supports 46 46, thus taking the weight off from the trunnions; but when the animal is secured the said supports will be lowered away from the stall by lifting the toe-levers 47 47, thus leaving the stall with the animal confined therein free to be turned to horizontal position, thus holding the animal firmly, but without danger of injury upon its side.

In some cases I shall provide for especially fastening the blocks to which the animal's legs are secured, as by providing the side pieces 8 with a series of hooks 48, to which the block-straps may be secured, as shown in Fig. 1, or I may use any other form of fastening device suitable for the purpose.

Having thus described my invention, what I claim as new, and desire to secure by Letters Patent, is—

1. A veterinary apparatus comprising a stall, trunnions on which said stall is supported, a floor hinged to the bottom of said stall, side walls attached to said stall, bars held adjacent to said floor and fastening devices for the legs of the animal connected to said bars, substantially as described.

2. A veterinary apparatus comprising a stall, front and rear supports for said stall, vertically-adjustable trunnions held by said supports and on which the stall is pivoted and supports for the bottom of said stall and means for moving them vertically for lifting the weight off from the trunnions, substantially as described.

3. In a veterinary apparatus a stall having a hinged floor and hinged side walls, means attached to said side walls for confining an animal in said stall, vertically-movable trunnions on which said stall is pivoted and means for lifting the weight of the stall and animal off from the trunnions, substantially as described.

4. In a veterinary apparatus a pair of trunnions, a pair of cleats in which said trunnions are held, a stall, a front and rear support for said stall, two or more mortises in said supports for holding said cleats at various heights, a second cleat on each trunnion and two or more mortises in the timbers of said stall to receive said last-mentioned cleats, substantially as described.

SAMUEL T. BAILEY.

Witnesses:
H. ALBERTUS WEST,
H. MERRILL.